US006950132B1

(12) United States Patent
Kozuka

(10) Patent No.: US 6,950,132 B1
(45) Date of Patent: Sep. 27, 2005

(54) IMAGE SENSOR AND METHOD FOR DRIVING AN IMAGE SENSOR FOR REDUCING FIXED PATTERN NOISE

(75) Inventor: Hiraku Kozuka, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/161,405

(22) Filed: Sep. 28, 1998

(30) Foreign Application Priority Data

Oct. 6, 1997 (JP) .................................. 9-272574
Oct. 6, 1997 (JP) .................................. 9-272575

(51) Int. Cl.[7] .......................................... H04N 9/64
(52) U.S. Cl. ................................................ 348/243
(58) Field of Search ................ 348/300, 262, 348/264, 241, 265, 243, 301; 358/294

(56) References Cited

U.S. PATENT DOCUMENTS

| | | | |
|---|---|---|---|
| 4,584,607 A | | 4/1986 | Miyazawa ................... 358/209 |
| 4,672,453 A | * | 6/1987 | Sakamoto .................... 348/311 |
| 4,780,765 A | * | 10/1988 | Hamasaki et al. ........... 348/303 |
| 4,835,404 A | * | 5/1989 | Sugawa et al. .............. 348/300 |
| 4,942,474 A | * | 7/1990 | Akimoto et al. ............. 348/301 |
| 4,965,570 A | * | 10/1990 | Hatanaka et al. ........... 348/241 |
| 5,021,888 A | * | 6/1991 | Kondou et al. ................ 348/76 |
| 5,109,440 A | * | 4/1992 | Kawahara et al. .......... 348/294 |
| 5,229,848 A | * | 7/1993 | Sugasawa .................... 348/264 |
| 5,262,870 A | * | 11/1993 | Nakamura et al. .......... 348/300 |
| 5,311,320 A | | 5/1994 | Hashimoto ................... 348/243 |
| 5,321,528 A | * | 6/1994 | Nakamura .................... 348/241 |
| 5,329,312 A | * | 7/1994 | Boisvert et al. ............. 348/257 |
| 5,591,960 A | * | 1/1997 | Furukawa et al. ........ 250/208.1 |
| 5,592,222 A | * | 1/1997 | Nakamura et al. .......... 348/300 |
| 5,640,207 A | * | 6/1997 | Rahmouni et al. .......... 348/374 |
| 5,771,070 A | * | 6/1998 | Ohzu et al. .................. 348/241 |
| 5,907,359 A | * | 5/1999 | Watanabe ................. 348/222.1 |
| 5,933,188 A | * | 8/1999 | Shinohara et al. .......... 348/296 |
| 6,002,287 A | * | 12/1999 | Ueno et al. .................. 327/307 |
| 6,118,115 A | * | 9/2000 | Kozuka et al. ........... 250/208.1 |
| 6,130,712 A | * | 10/2000 | Miyazaki et al. ........... 348/243 |

(Continued)

FOREIGN PATENT DOCUMENTS

EP         0488674         6/1992

(Continued)

OTHER PUBLICATIONS

Shin Kikuchi et al. "High Speed, High Gradation Contact Type Linear Sensor BASIS Multi-Chip Contact Sensor", Journal of Television Society, vol. 47, No. 9, (1993), pp. 1177-1182, in Japanese with English Abstract.

Primary Examiner—Wendy R. Garber
Assistant Examiner—Jason Whipkey
(74) Attorney, Agent, or Firm—Fitzpatrick, Cella, Harper & Scinto

(57) ABSTRACT

There is provided a method of driving an image sensor which can remove FPN resulting from inter-chip variations without requiring any dark correction. A semiconductor photosensor chip has a plurality of sensor modules mounted on a mounting substrate, and a semiconductor device in which at least an N signal input buffer circuit for receiving N signals, an S signal input buffer circuit for receiving S signals, a differential circuit for calculating any difference between the outputs from the N and S signal input buffer circuits, and a voltage clamping circuit for clamping the output from the differential circuit are formed on a single semiconductor substrate, and the voltage clamping circuit clamps the reset state of S and N signal common output line.

1 Claim, 12 Drawing Sheets

U.S. PATENT DOCUMENTS

| | | | |
|---|---|---|---|
| 6,184,516 B1 * | 2/2001 | Sawada et al. | 250/208.1 |
| 6,215,521 B1 * | 4/2001 | Surisawa et al. | 348/314 |
| 6,288,742 B1 * | 9/2001 | Ansari et al. | 348/241 |
| 6,421,085 B1 * | 7/2002 | Xu | 348/300 |
| 2004/0027471 A1 * | 2/2004 | Koseki et al. | 348/300 |

FOREIGN PATENT DOCUMENTS

| | | |
|---|---|---|
| EP | 0741493 | 11/1996 |
| JP | 61-214657 | 9/1986 |
| JP | 62-115865 | 5/1987 |
| JP | 3-280663 | 12/1991 |

\* cited by examiner

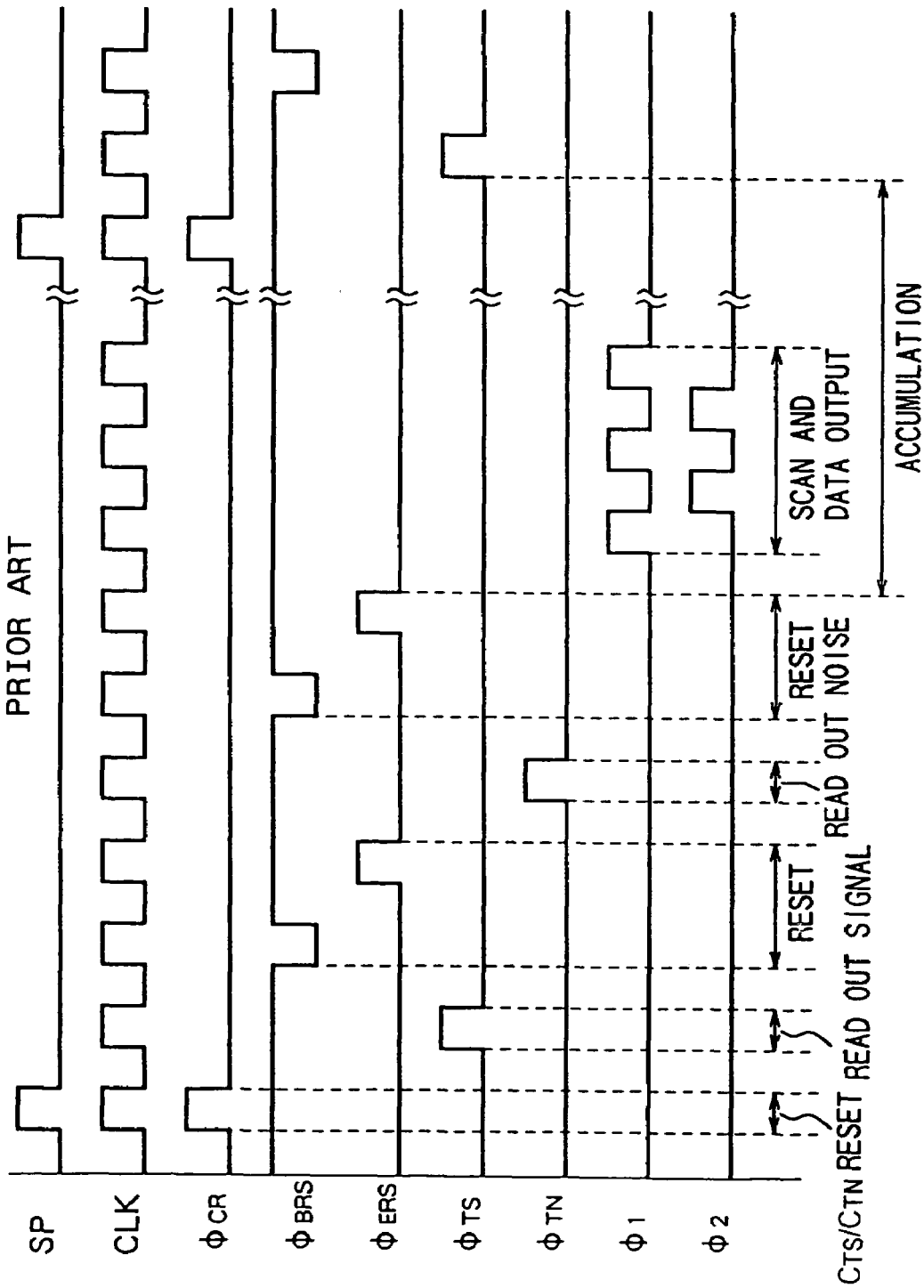

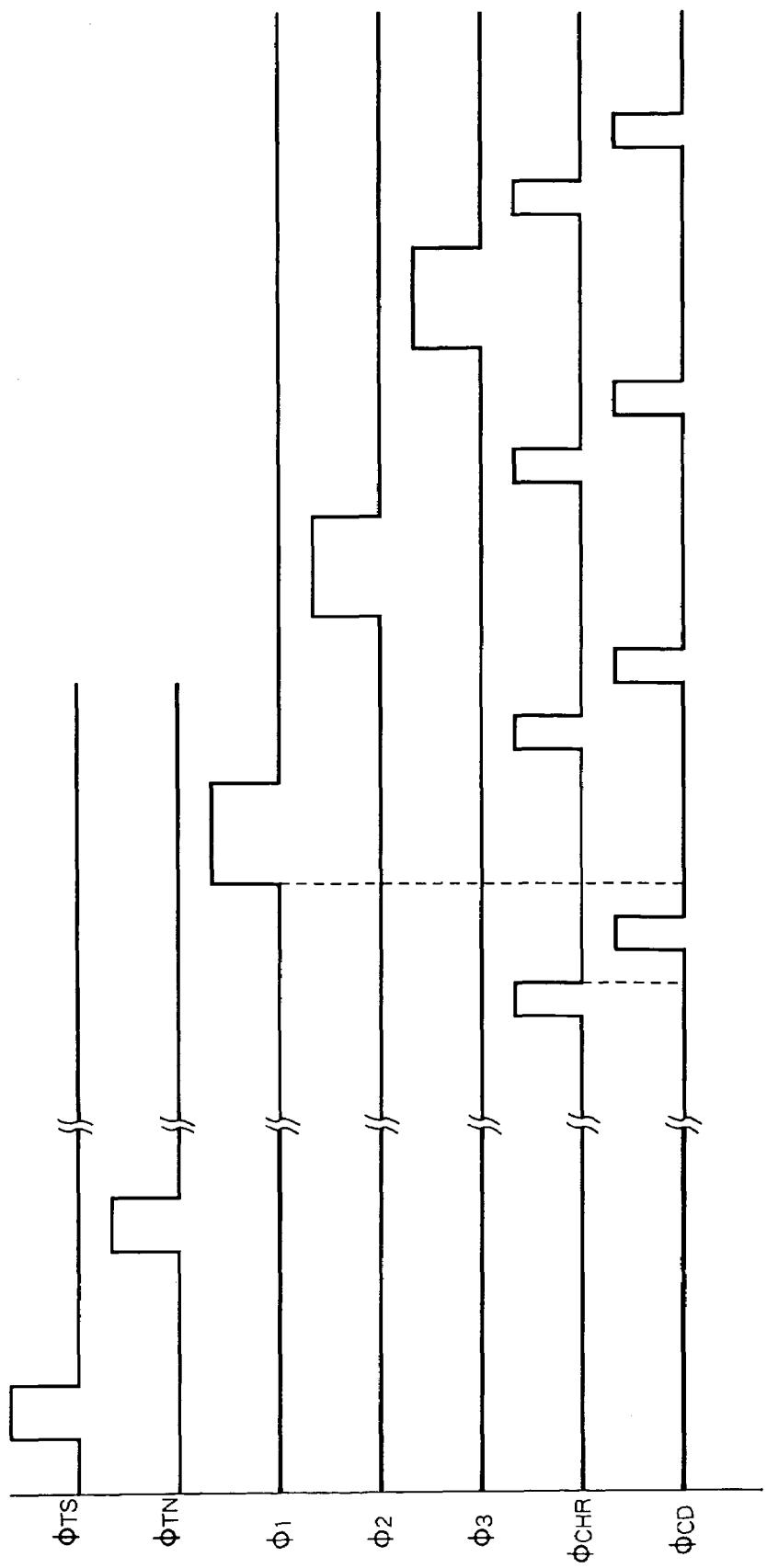

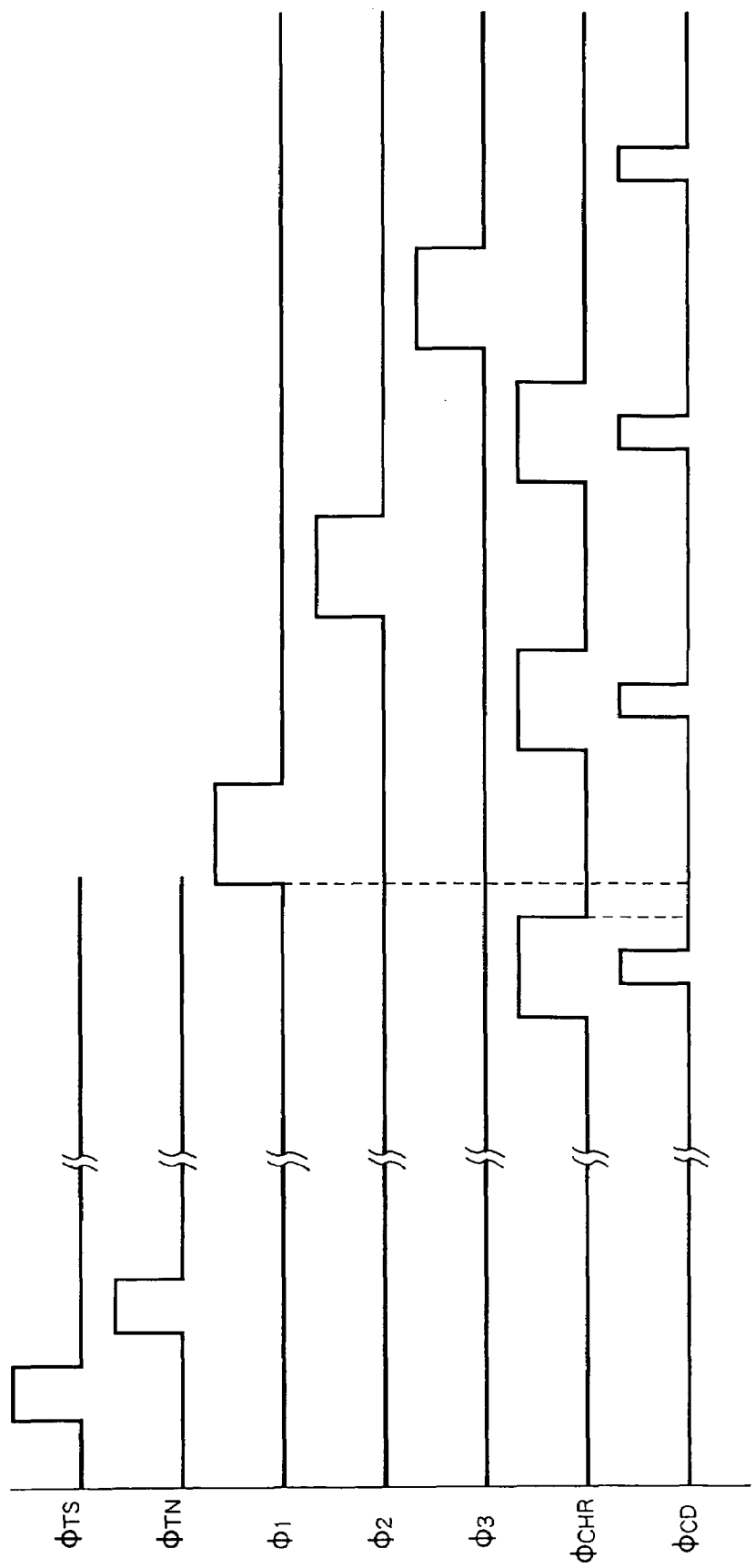

IMAGE SENSOR AND METHOD FOR DRIVING AN IMAGE SENSOR FOR REDUCING FIXED PATTERN NOISE

BACKGROUND OF THE INVENTION

The present invention relates to a method of driving an image sensor (for example, a linear contact image sensor) for reading images in a facsimile, image scanner, digital copying machine, X-ray imaging apparatus, or the like and, more particularly, to removal of fixed pattern noise (FPN) arising from inter-chip differences or deviations in a contact image sensor in which a plurality of semiconductor photosensor chips are mounted on a mounting substrate.

In recent years, in the field of linear photo-electric conversion devices, an equal-magnification (magnification=1) contact image sensor in which a plurality of semiconductor photosensors are mounted has been extensively developed in addition to CCDs using reducing optics.

FIG. 1A is a partial block diagram showing the arrangement of a conventional contact image sensor having an amplifier element, which is disclosed in Journal of Television Society Vol. 47, No. 9 (1993), pp. 1180. In this contact image sensor, a plurality of amplifier type semiconductor photosensor chips having amplifier elements in units of pixels are mounted. Especially, FIG. 1A shows the arrangement of a single sensor chip.

The output from one sensor module is externally output via an analog switch 37. FIG. 1B shows a state wherein a plurality of sensor chips are connected. In order to enable the output of a specific chip, the analog switch 37 of that chip is energized.

As shown in FIG. 1A, one sensor chip comprises a plurality of sensor elements (phototransistors 9), an output line 3 (4) which commonly receive the outputs from these transistors 9, differential amplifier 33, clamping circuit 204, and buffer amplifier 36, the above-mentioned analog switch 37, and the like.

In the image sensor, since fixed pattern noise (FPN) resulting from variations of the amplifier elements used for a plurality of pixels is produced, FPN produced in the chip is removed by calculating the difference between a light signal (S signal) and noise signal (N signal) in a dark state (to be referred to as an "S-N method" hereinafter for the sake of simplicity) in the prior art shown in FIG. 1A.

FPN removal using the S-N method in the image sensor shown in FIG. 1A will be described below with reference to FIGS. 1A and 2 (timing chart).

In FIG. 1A, the bipolar transistor 9 constructs a sensor portion of a photo-electric conversion element. Each transistor 9 is connected to a MOS transistor 27 (28), MOS transistor 31 (32), capacitances $C_{TS}1$ and $C_{TN}2$ which are reset by the reset signal $\phi_{CR}$, and MOS transistor 25 (26), and the MOS transistors 25 and 26 of the respective bits are connected to the common output lines 3 and 4. Reference symbols $C_{HS}$ and $C_{HN}$ denote capacitances for the output lines 3 and 4. The output lines 3 and 4 are connected to the differential amplifier 33 via voltage-follower amplifiers 13$a$ and 13$b$.

Upon irradiation of light onto the sensor 9 of the photo-electric conversion element, a light signal (i.e., a charge) corresponding to its light amount hv (h is a Planck constant, and v is the frequency of the light) is accumulated on the PN junction of the emitter-follower transistor 9. Upon completion of accumulation, the transistor 9 is set in a floating state (by turning off $\phi_{ERS}$), and $\phi_{TS}$ is turned on to transfer the charge accumulated on the PN junction to the light signal holding capacitance $C_{TS}1$. Subsequently, a reset pulse $\phi_{ERS}$ is turned on to reset the sensor (transistor 9). At this time, the charge transferred to the capacitance $C_{TS}1$ contains noise components. After that, $\phi_{TN}$ is turned on to transfer a noise (N) signal of the sensor to the noise signal holding capacitance $C_{TN}2$. Again, a reset pulse $\phi_{BRS}$ is turned on to enable a MOS transistor 29, and the reset pulse $\phi_{ERS}$ is turned on to enable a MOS transistor 30. Since the MOS transistors 29 and 30 are ON, the sensor transistor 9 is reset and then starts the next accumulation.

Some components of the charges accumulated on the $C_{TS}1$ and $C_{TN}2$ are respectively shifted to the output line capacitances $C_{HS}$ and $C_{HN}$ during the next accumulation. This operation is called "capacitive division" for the sake of simplicity since the original charges accumulated on $C_{TS}1$ and $C_{TN}2$ are divided as a result of movement of the charges between the two capacitances. The "capacitive division" is activated by the MOS transistors 25 and 26 when a control timing signal $\phi_N$ is ON. The "capacitive division" will be explained below.

In order to reset holding capacitances $C_{HS}$ 7 and $C_{HN}$ 8, MOS transistors 5 and 6 are turned on by a signal $\phi_{HC}$. After these capacitances are reset, the MOS transistors 25 and 26 are turned on by the timing signal $\phi_N$ output from a shift register (not shown). When the MOS transistors 25 and 26 are ON, data in the light signal holding capacitance $C_{TS}1$ and noise signal holding capacitance $C_{TN}2$ (some components of charges) are respectively transferred to the capacitances $C_{HS}7$ and $C_{HN}$ 8, connected to the common output lines 3 and 4. Consequently, the potential that appears on the output line 3 (4) is determined by the ratio between the capacitances $C_{HS}$ 7 and $C_{TS}$ 1 (the ratio between $C_{HN}$ 8 and $C_{TN}$ 2). The potential on the output line 3 (4) is amplified by the differential amplifier 33 via an amplifier 13$a$ (13$b$).

Although not shown in FIG. 1A, as described above, one sensor chip has sensor elements 9 for a plurality of bits. In order to read out the sensor output of the next bit, the capacitances $C_{HS}$ 7 and $C_{HN}$ 8 are reset by turning on the MOS transistors 5 and 6, and a drive signal $\phi_N$ for that bit is then supplied to read out data accumulated on the capacitances $C_{TS}$ and $C_{TN}$ to the common capacitances $C_{HS}$ 7 and $C_{HN}$ 8.

By repeating such shift operation, the charges accumulated on the sensors (transistors 9) of the respective bits are read out to the capacitances $C_{HS}$ 7 and $C_{HN}$ 8. Voltages induced on the capacitances $C_{HS}$ 7 and $C_{HN}$ 8 are input to the differential amplifier 33 via the voltage-follower amplifiers 13$a$ and 13$b$.

Fixed pattern noise FPN in the sensor IC mainly arises from variations of $h_{FE}$ or the like of the bipolar transistors 9 of the respective pixels (bits). Such variations are reflected in the charges accumulated on the holding capacitances $C_{TS}$ and $C_{TN}$. FPN removal using the S-N method removes noise resulting from $h_{FE}$ variations of the bipolar transistors 9 in units of pixels by detecting any level differences between the signal lines by the differential amplifier 33 upon reading out the charges accumulated on the holding capacitances $C_{TS}$ and $C_{TN}$ onto the common signal lines 3 and 4.

The S-N method using the differential amplifier 33 is effective for removing FPN produced in the sensor chip.

However, in case of the equal-magnification contact image sensor in which a plurality of photosensors are mounted, since a plurality of linear line sensor chips are cascade-connected, as shown in FIG. 1B, as it is of contact type, the differential amplifiers 33 and buffer amplifiers 36 are arranged in units of chips. Among the differential amplifiers 33 (or buffer amplifiers 36) of the different chips, the DC components of the output voltages vary due to variations of offset potentials. Such variations of the DC offset voltages among chips will be referred to as "FPN resulting from inter-chip differences (inter-chip FPN)" in contrast to "FPN produced in the chip (intra-chip FPN)" in this specification.

The above-mentioned S-N method is not effective for inter-chip FPN.

In the image sensor shown in FIG. 1A, the clamping circuit 204 copes with inter-chip FPN resulting from the differential amplifier 33. That is, the clamping circuit 204 is constructed by a capacitance 34 for cutting DC components from the output from the amplifier 33, and a MOS transistor 35 for fixing to earth level the potential between this capacitance 34 and the input portion of the amplifier 36, that shifts to the minus side. With this arrangement, the clamping circuit 204 can prevent inter-chip FPN attributed to the differential amplifier 33.

However, the present inventors found that it is difficult to remove inter-chip FPN arising from the offsets of the output buffer amplifier 36 even by the prior art technique shown in FIG. 1A.

Especially, when the initial stage of the output buffer amplifier 36 adopts a MOS top arrangement (in which the MOS transistor is located on the input side), since threshold value unbalance of that MOS influences the offsets, offset variations of, e.g., around 10 mV are produced among the output buffer amplifiers 36 of different chips. Even after a plurality of sensor chips are mounted, as shown in FIG. 1B, FPN of around 10 mV is produced.

Hence, when a high-gradation image is to be obtained using the conventional image sensor, dark correction is required in units of chips to assure its dynamic range, and the cost required for system design and manufacture increases.

In the prior art, each sensor chip includes a large-scale analog circuit such as a sensor, holding capacitances, and the like, and 10 to 20 chips are mounted. For this reason, the chip area for the analog circuit portion increases, and it is hard to reduce cost.

Furthermore, each sensor chip includes both a digital circuit such as MOS transistors for light signal read and reset, and the aforementioned analog circuit, and the sensor output is readily influenced by noise produced by the digital circuit.

SUMMARY OF THE INVENTION

It is an object of the present invention to provide a high-performance image sensor which can remove FPN arising from inter-chip variations and does not require any dark correction.

It is another object of the present invention to provide an inexpensive image sensor which can obviate the need for any dark correction means, and can avoid an increase in cost resulting from an increase in chip area, which is inevitable in the prior art.

It is still another object of the present invention to provide a drive method that can remove inter-chip FPN in an image sensor.

It is still another object of the present invention to provide an image sensor and its drive method, which can simultaneously remove intra-chip FPN and inter-chip FPN.

It is still another object of the present invention to provide an image sensor in which a plurality of sensor chips are mounted on a single mounting substrate, and a circuit for removing inter-chip FPN is mounted on a semiconductor substrate different from that of the plurality of sensor chips.

It is still another object of the present invention to provide an image sensor in which a power supply for a plurality of sensor chips is isolated from that for a circuit on the semiconductor substrate.

It is still another object of the present invention to provide an image sensor in which ground for a plurality of sensor chips is isolated from that for a circuit on the semiconductor substrate.

It is still another object of the present invention to provide an image sensor in which differential amplifiers are removed from individual sensor chips.

It is still another object of the present invention to provide an image sensor which can adjust gain and can remove individual differences of image sensor assemblies, and its drive method.

BRIEF DESCRIPTION OF THE DRAWINGS

FIG. 2 is a timing chart for explaining the operation of the conventional image sensor shown in FIG. 1A;

FIG. 5 is a timing chart showing one operation example of the image sensor of the first embodiment;

FIG. 6 is a timing chart showing another operation example of the image sensor of the first embodiment;

DETAILED DESCRIPTION OF THE PREFERRED EMBODIMENTS

The arrangement, operation, and drive method of an image sensor according to the preferred embodiments of the present invention will be explained hereinafter with reference to the accompanying drawings.

FIRST EMBODIMENT

Figure 3:
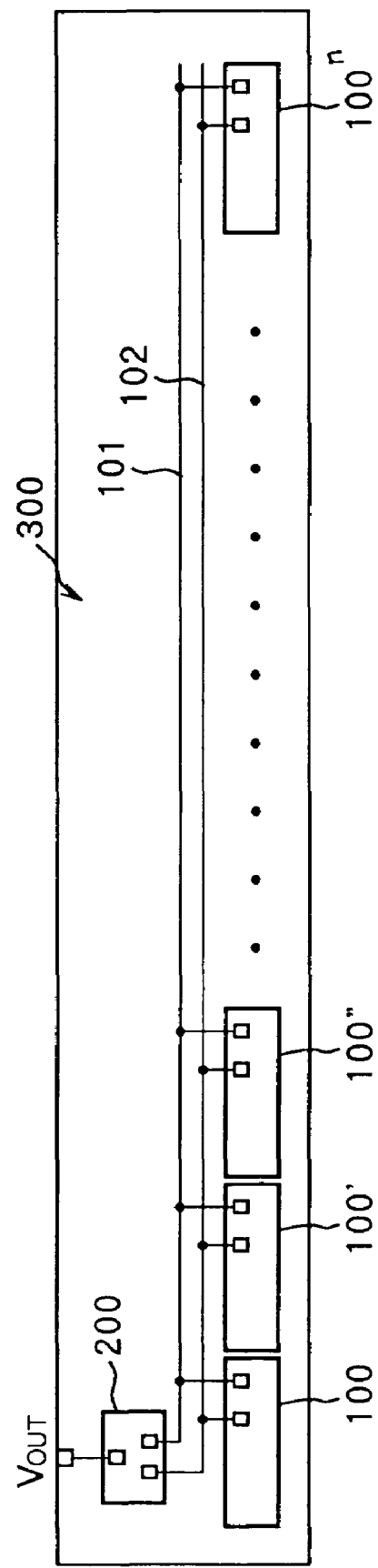
FIG. 3 is a schematic view showing an image sensor assembly according to the first embodiment of the present invention.

FIG. 3 shows the arrangement of an assembly 300 of a contact image sensor according to the first embodiment. In FIG. 3, the assembly 300 has a plurality of sensor chips 100, 100', 100", ..., 100$^n$, a pair of common output lines 101 and 102 from these sensor chips, and one amplifier chip 200. In principle, each of the sensor chips 100, ... has two output terminals, which are respectively connected to the common output lines 101 and 102. The two input terminals of the amplifier chip 200 are respectively connected to the common output lines 101 and 102. The amplifier chip 200 has a single output terminal $V_{OUT}$. The output from this terminal $V_{OUT}$ is that of the assembly 300.

Note that parts such as capacitances, resistors, and the like (not shown) are also mounted on the assembly 300 shown in FIG. 3.

In FIG. 3, the sensor chips 100, 100', and 100", and the amplifier chip 200 are mounted on a single mounting substrate 300, but the amplifier chip 200 may be mounted on another mounting substrate. However, since the sensor chips 100, ... are mounted on a single mounting substrate together with the amplifier chip 200, the size of the assembly 300 can be reduced, and external noise that may be produced in the outputs of the sensor chips 100, ... can be reduced, thus stabilizing the output. Note that the amplifier chip 200 which is encapsulated in a ceramic package may be mounted on the mounting substrate 300 by soldering, or its bear chip may be mounted on the mounting substrate 300 by dye-bonding. When the bear chip is mounted by dye-bonding, common chucks can be used for the sensor and amplifier chips if the short side length of each sensor chip is set to be substantially equal to that of the amplifier chip, thus reducing the number of steps in a mounting process.

Figure 4A:
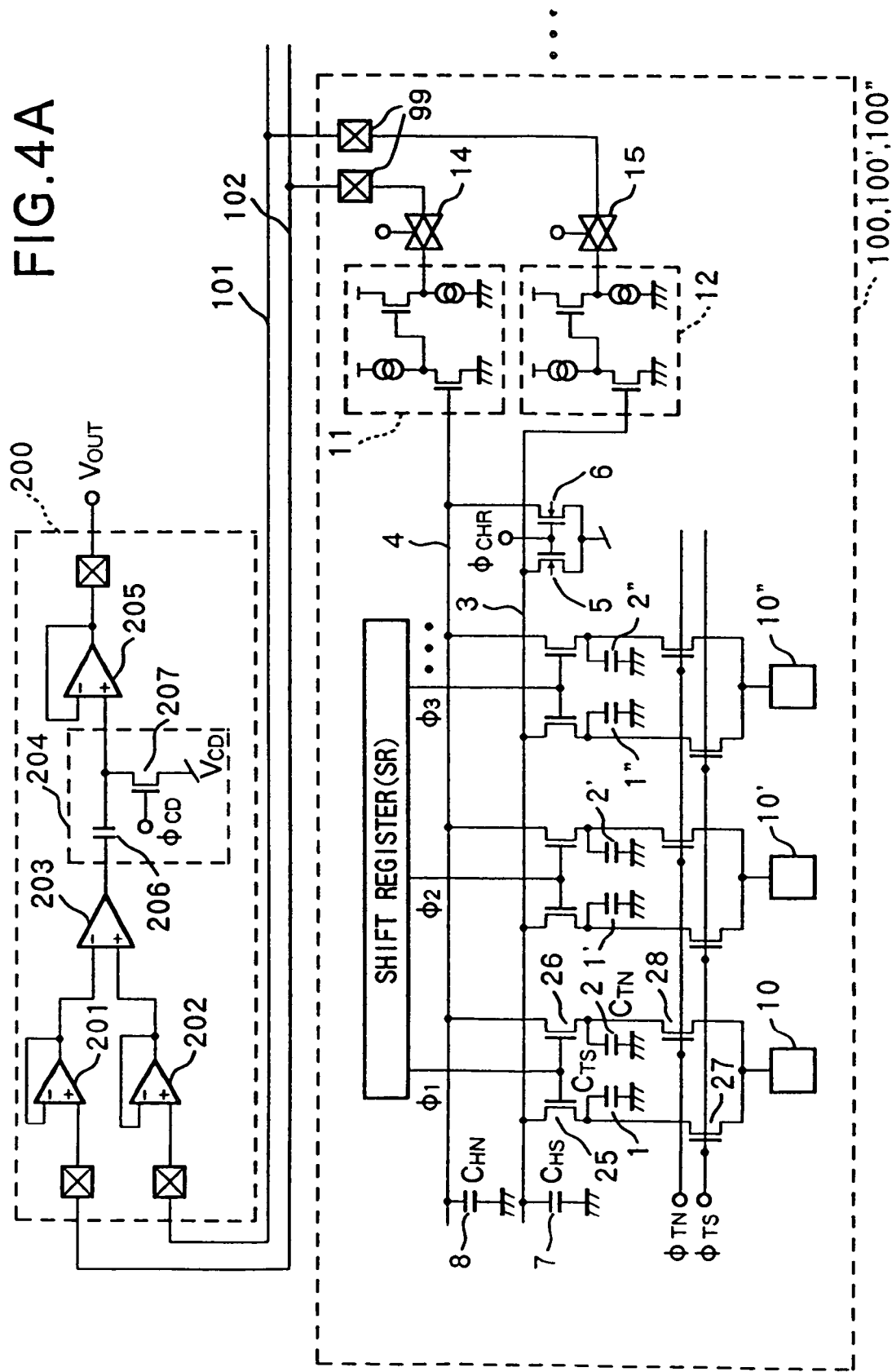
FIG. 4A is the equivalent circuit diagram of an image sensor of the first embodiment.

FIG. 4A shows the equivalent circuit of each sensor chip (100, 100', 100", ... ) and that of the amplifier chip 200 according to the first embodiment.

In FIG. 4A, the sensor chip according to the first embodiment has a plurality of photo-electric converters 10, 10', 10", ..., noise signal holders 2, 2', 2", ... for reading out noise signals (to be abbreviated as "N signals" hereinafter) from these photo-electric converters and holding the N signals, S signal holders 1, 1', 1", ... for reading out light signals (to be referred to as "S signals" hereinafter) from the photo-electric converters and holding the S signals, an N signal output line 4 for commonly outputting N signals, an S signal output line 3 for commonly outputting S signals, reset circuits 5 and 6 for resetting the N and S signal output lines 4 and 3, and a read-out circuit for reading out signals held by the N signal holders 2, 2', 2", ... and those held by the S signal holders 1, 1', 1", ... by capacitance or capacitive division between capacitances $C_{HN}$ 8 and $C_{HS}$ 7 of the N and S signal output lines 4 and 3. The capacitance division will be explained later.

Note that the photo-electric converter 10, 10', 10", ... preferably use bipolar elements such as, e.g., BASIS, or amplifiers each consisting of a photo-diode and MOS transistor.

The signal holder preferably comprises a capacitor, as shown in FIG. 4A, and the reset circuit preferably comprises a transistor circuit.

Each of the photo-electric converters 10, 10', 10", ... is connected to a pair of MOS transistors 27 and 28. An array of MOS transistors 27 commonly receive a control signal $\phi_{TS}$. An array of MOS transistors 28 commonly receive a control signal $\phi_{TN}$. When a transfer pulse $\phi_{TS}$ is turned on, S signals are stored in the S signal holders (capacitances) $C_{TS}$ 1, 1', 1", ... ; when a transfer pulse $\phi_{TN}$ is turned on, N signals are stored in the N signal holders (capacitances) $C_{TN}$ 2, 2', 2", .... That is, when the transfer pulses $\phi_{TS}$ and $\phi_{TN}$ are turned on, the S and N signals detected by the photo-electric converters 10, 10', 10", ... are respectively stored in the holders $C_{TS}$ 1, 1', 1", ..., and the holders $C_{TN}$ 2, 2', 2", ....

In order to supply the outputs from the photo-electric converters 10, 10', 10", ... onto the common output lines 3 and 4, the common output lines 3 and 4 must be reset before that. The MOS transistors 5 and 6 are turned on to reset the S and N signal output lines 3 and 4. Upon being reset in this way, the lines 3 and 4 are ready to transfer data to the capacitances $C_{HS}$ 7 and $C_{HN}$ 8. The MOS transistors 25 and 26 are then enabled using a shift pulse $\phi_1$ of a shift register SR to output data (charges) in the capacitances $C_{TS}$ and $C_{TN}$ in turn onto the common output lines 3 and 4 by capacitance division. Some components of the charges accumulated on $C_{TS}$ and $C_{TN}$ are respectively transferred to the capacitances $C_{HS}$ 7 and $C_{HN}$ 8. As a result, the charge accumulated on CTS is divided into $C_{TS}$ 1 and $C_{HS}$ 7, and the charge accumulated on $C_{TN}$ is divided into $C_{TN}$ 2 and $C_{HN}$ 8. When the charge is divided into two capacitances, the potential between these two capacitances will be referred to as the capacitively divided output in this specification.

The capacitively divided outputs are impedance-converted by amplifiers 11 and 12, and are then output onto the S and N signal lines 101 and 102 on the mounting substrate via analog switches 14 and 15. In FIG. 4A, each of the amplifiers 11 and 12 uses a source-follower circuit including two transistors, but may use, e.g., a normal voltage-follower circuit.

Data detected by the sensor element 10 is output onto the S and N signal lines 101 and 102 in response to a shift pulse $\phi_1$, as described above. Next, data detected by the sensor element 10' is similarly output onto the S and N signal lines 101 and 102 in response to a shift pulse $\phi_2$. Furthermore, data detected by the sensor elements 10" is output onto the S and N signal lines 101 and 102 in response to a shift pulse $\phi_3$.

The sensor module (100, 100', 100", ... ) as a semiconductor photosensor is connected to the S and N signal lines 101 and 102 and one amplifier chip 200 mounted on a single mounting substrate via terminals 99 mounted on the same mounting substrate by wire bonding. That is, S and N signals from the sensor modules (100, 100', 100", ... ) are input to the amplifier chip 200.

The amplifier chip 200 shared by the plurality of sensor modules (100, 100', 100", ... ) has a buffer amplifier 201 for receiving an N signal, a buffer amplifier 202 for receiving an S signal, a differential amplifier 203 for calculating the difference between the outputs from the amplifiers 201 and 202, a voltage clamping circuit 204 connected to the output side of the differential amplifier 203, and an output buffer amplifier 205, as shown in FIG. 4A.

Note that the voltage clamping circuit 204 comprises a clamping capacitance 206, and a MOS switch 207, and has a function of clamping the input signal toward a clamping reset voltage $V_{CD}$.

The characteristic features of the first embodiment shown in FIG. 4A are as follows:

I: The clamping circuit 204 for removing inter-chip FPN is mounted outside the plurality of sensor chips 100, ... but inside the amplifier chip 200 as a circuit common to these sensor chips. For this reason, clamping circuits (204 in FIG. 1A) in units of sensor chips, which are required in the conventional image sensor (FIG. 1A), can be omitted.

II: In order to effectively remove inter-chip-FPN, the generation timing of a signal $\phi_{CHR}$ for controlling the reset timing of the output lines 3 and 4 and the generation timing of a signal $\phi_{CD}$ for controlling the clamping circuit 204 are appropriately set. Two examples of the generation timings of $\phi_{CHR}$ and $\phi_{CD}$ will be explained later.

III: Since the differential amplifier 203 for differentially amplifying the outputs from the pair of common output lines 3 and 4 is mounted inside the amplifier chip 200, the number of differential amplifiers which are required in units of chips in the prior art (FIG. 1A) can be reduced to one, and the number of circuit elements can be greatly decreased.

IV: As a combined effect of the features I to III, the timings set in II can remove not only "inter-chip FPN" but also "intra-chip FPN" at the same time.

Figure 1A:
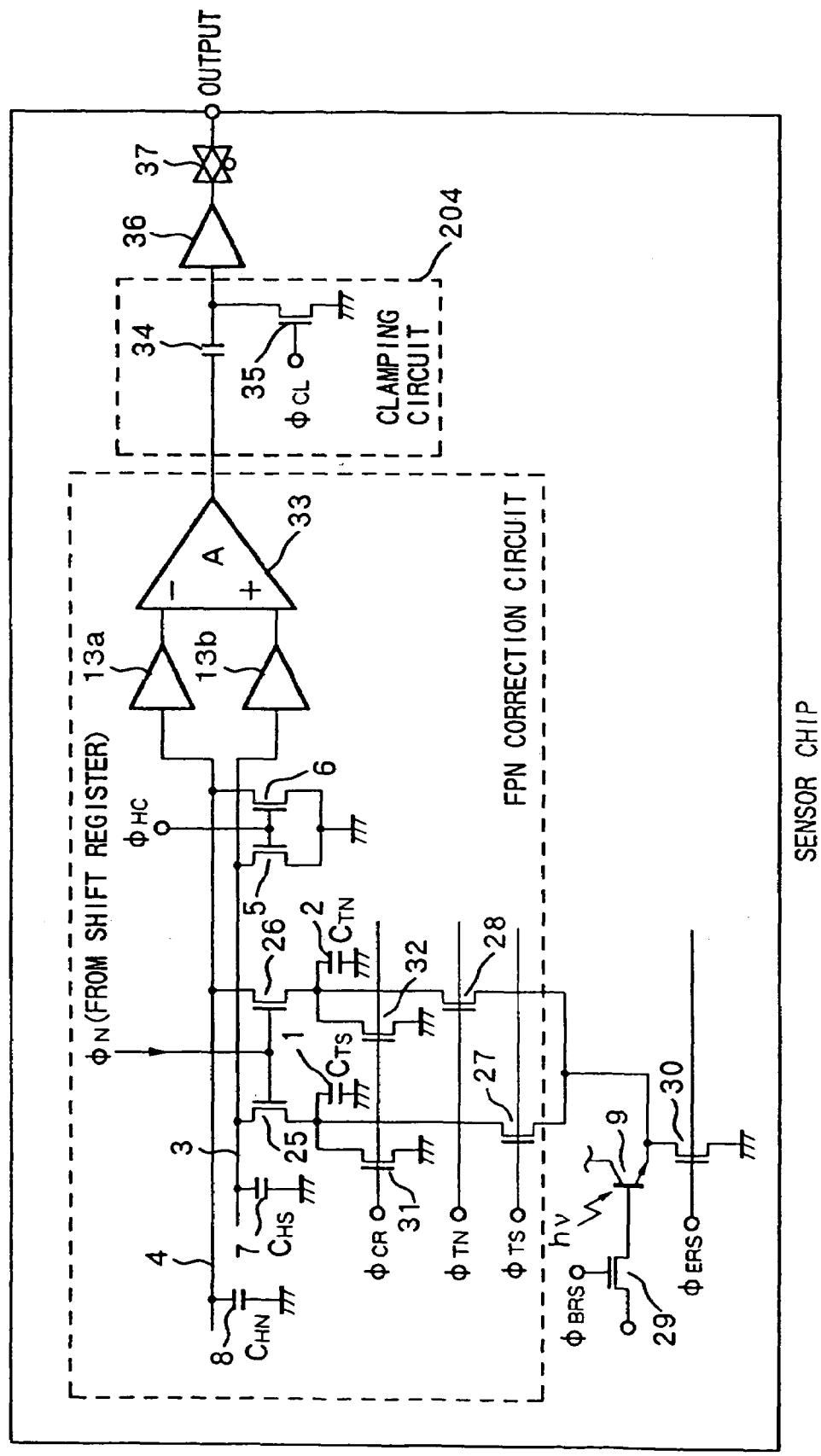
FIG. 1A is the equivalent circuit diagram of a conventional image sensor.
Figure 1B:
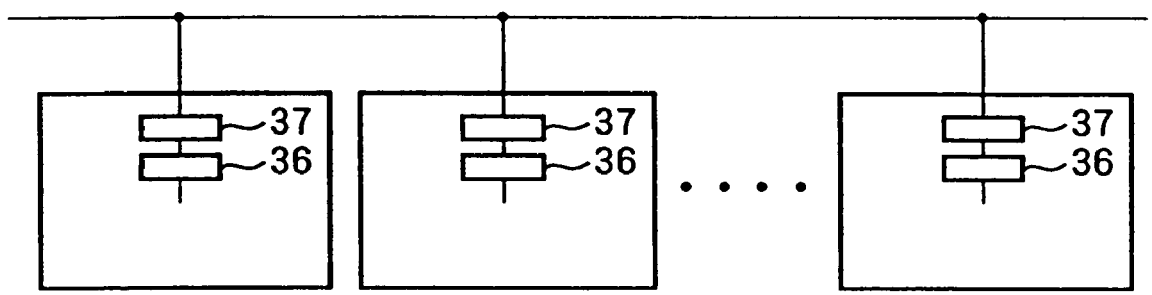
FIG. 1B is a diagram for explaining connections among individual sensor chips in the conventional image sensor shown in FIG. 1A.

According to the arrangement shown in FIG. 4A, since the buffer amplifier 36 can be omitted from each sensor chip, generation of inter-chip FPN can be reduced as compared to FIG. 1A. However, since the source-follower amplifiers 11 and 12 are required in place of the buffer amplifier 36, "inter-chip FPN" due to inter-chip variations of the source-follower amplifier 11 (or 12) remains unsolved.

The drive control method for the image sensor of the first embodiment, especially, the drive control-method for removing inter-chip FPN will be explained below with reference to FIG. 5.

FIG. 5 shows signals $\phi_{TN}$ and $\phi_{TS}$ for determining the charge transfer timings of the converter 10, shift pulses $\phi_1$, $\phi_2$, and $\phi_3$ from the shift register SR, a reset pulse $\phi_{CHR}$ for resetting the common signal lines 3 and 4, and a reset pulse $\phi_{CD}$ for resetting the clamping circuit 204 in the amplifier chip 200.

Figure 4B:
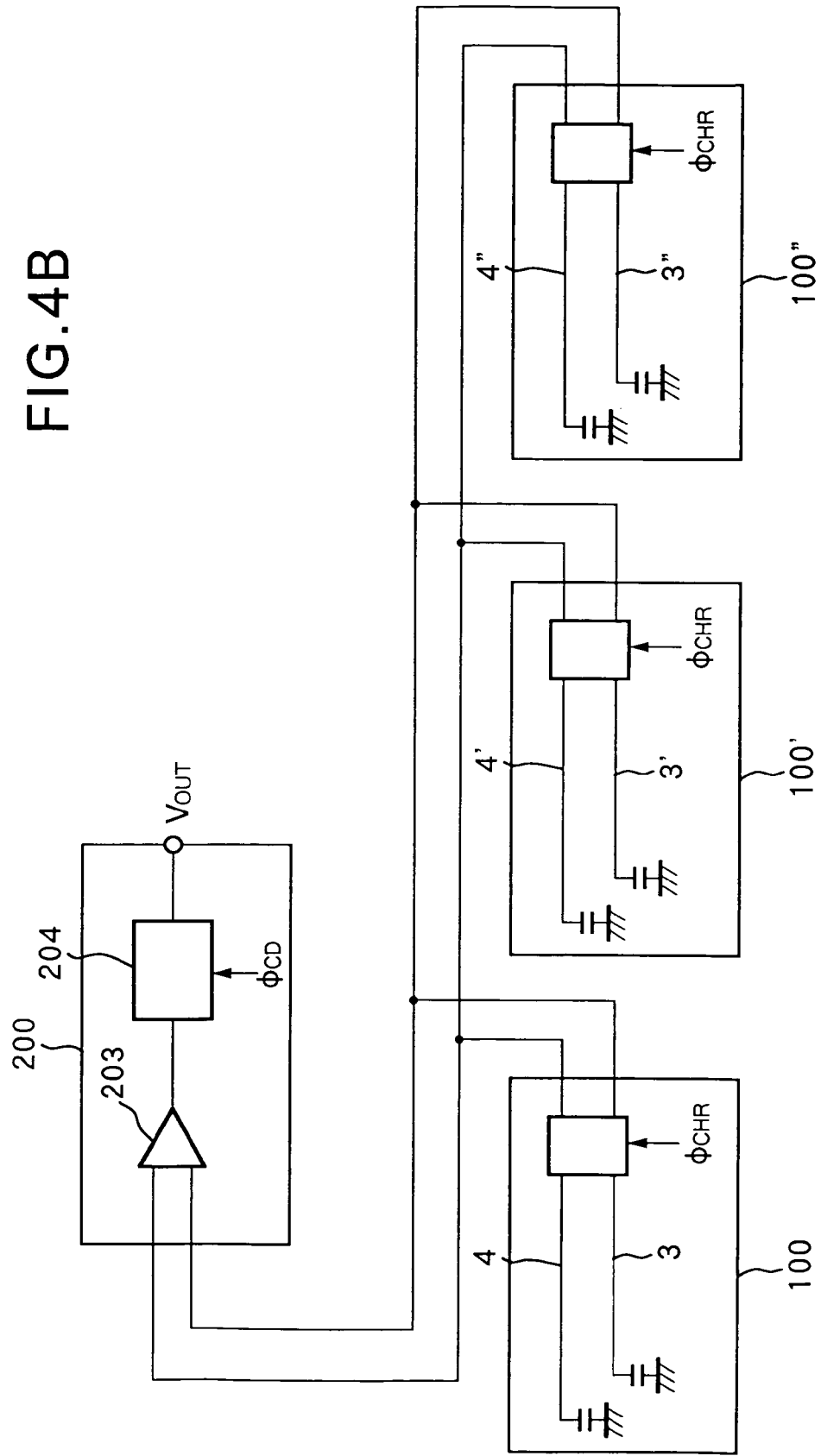
FIG. 4B is a diagram for explaining connections of principal part of the image sensor of the first embodiment.

FIG. 4B shows principal elements of the image sensor (FIG. 4A) of the first embodiment. Referring to FIG. 4B, the reset circuit which receives $\phi_{CHR}$ and the clamping circuit 204 which receives $\phi_{CD}$ are present between the capacitances $C_{HS}$ 7, 7', 7", ... (capacitances $C_{HN}$ 8, 8', 8", ...) on the common output lines 3, 3', 3" (and output lines 4, 41, 4"), and the output $V_{OUT}$ of the amplifier chip 200. The MOS transistors 5 and 6 must be reset by $\phi_{CHR}$ at each shift timing ($\phi_1$, $\phi_2$, $\phi_3$, ...) before each of the pulses $\phi_1$, $\phi_2$, $\phi_3$, ... is input, so as to cancel variations (intra-chip FPN) of each sensor converter 10 in a single chip. DC offset variations resulting from the source-follower amplifiers 11 and 12 can be removed by driving the clamping circuit 204 in FIG. 4B. More specifically, referring to FIG. 4A, a clamping pulse $\phi_{CD}$ which changes LOW→"H"→LOW is input to the gate of the MOS transistor 207. During the LOW period of $\phi_{CD}$, the differential amplifier 203 outputs an output signal which reflects DC offset variations caused by the source-follower amplifiers 11 and 12. This voltage is input to the DC cutoff capacitor (clamping capacitance) 206. When $\phi_{CD}$ changes from LOW to HIGH, the source side of the MOS transistor 207 is clamped to a potential $V_{CD}$. Then, the potential difference across the two terminals of the DC cutoff capacitor 206 reflect DC offset variations caused by the source-follower amplifiers 11 and 12. In this state, when $\phi_{CD}$ changes from HIGH to LOW, since the MOS transistor 207 is turned off, the charge accumulated on the capacitor 206 is held at a charge value for canceling inter-chip FPN. When a shift pulse $\phi_N$ is applied from the shift register SR to the MOS transistors 25 and 26 at that time, an output signal from which not only "intra-chip FPN" but also "inter-chip FPN" are canceled appears at the output of the voltage-follower amplifier 205. That is, it is important for the timings in FIG. 5:

V: to output the clamping pulse $\phi_{CD}$ before each shift pulse $\phi_N$ (one of $\phi_1$, $\phi_2$, $\phi_3$ . . . ); and VI: to reset the MOS transistors 5 and 6 before the clamping pulse $\phi_{CD}$ is output.

In the control timing example shown in FIG. 5, the reset pulse $\phi_{CHR}$ goes HIGH and then LOW before the clamping pulse $\phi_{CD}$ goes HIGH.

The operation of the circuit shown in FIG. 4A will be described in more detail below with the aid of FIG. 5.

After signals $\phi_{TN}$ and $\phi_{TS}$ are input, S signals have already been read out to the capacitances $C_{TS}$ 1, 1', 1", . . . , and N signals to the holding capacitances $C_{TN}$ 2, 2', 2", . . . . Read-out signals (shift pulses) $\phi_1$, $\phi_2$, $\phi_3$, . . . are output in turn from the shift register SR, and sensor detection signals are read out onto the signal lines 3 and 4 by capacitance division between the capacitances $C_{TS}$ and $C_{HS}$, and between $C_{TN}$ and $C_{HN}$, as described above.

In FIG. 4A, the MOS transistor 207 in the clamping circuit 204 is controlled by the control signal $\phi_{CD}$. According to the timings shown in FIG. 5, $\phi_{CD}$ is enabled after $\phi_{CHR}$ is enabled. Hence, during the period from when $\phi_{CHR}$ is enabled until $\phi_{CD}$ is enabled, the capacitances $C_{HS}$ 7 and $C_{HN}$ 8 are reset to desired voltages by $\phi_{CHR}$ immediately before the signals on the signal lines 3 and 4 are read out after $\phi_{CHR}$. In addition, the state after the capacitances $C_{HS}$ 7 and $C_{HS}$ 8 have been reset is clamped by $\phi_{CD}$, and is used as a reference state. Hence, the outputs after capacitance division contain vth variations of the source-follower amplifiers 11 and 12 in units of chips. However, since these outputs are obtained after Vth variations are corrected by the above-mentioned operations, inter-chip FPN that has conventionally posed a problem can be removed without any dark correction.

Modification of Control Timings

The control timings of the clamping circuit 204 of the first embodiment are not limited to those shown in FIG. 5.

FIG. 6 shows another timing example that can be applied to the image sensor (FIG. 4A) of the first embodiment. In the example shown in FIG. 6, the reset pulse $\phi_{CHR}$ is held at HIGH, and then goes LOW after the clamping pulse $\phi_{CD}$ goes LOW and before the shift pulse $\phi_N$ is turned on. According to the timing example shown in FIG. 6, since the reset state of the capacitances $C_{HS}$ 7 and $C_{HN}$ 8 by the reset pulse $\phi_{CHR}$ is clamped by the clamping pulse $\phi_{CD}$, the same effect as in the timing example shown in FIG. 5 can be obtained.

According to the first embodiment, since the need for a differential amplifier in each sensor chip can be obviated as compared to the image sensor shown in FIG. 1A, the output portion of each sensor chip can be simplified, and the chip area of the analog portion in each sensor chip can be minimized. In addition, since the analog portion for all the sensor chips can be integrated using the common signal lines 101 and 102, the chip area of each module can be minimized, thus attaining a cost reduction.

Modification of First Embodiment

In the image sensor assembly 300 of the first embodiment, when the power supply for the sensor chips 100, 100', 100", . . . and that for the amplifier chip 200 are independently set, a broad dynamic range of the output can be maintained even when the sensor power supply voltage is decreased.

In the first embodiment, a contact image sensor using a plurality of line sensor chips has been exemplified. However, the present invention is not limited to such specific sensor, but may be effective for a two-dimensional area sensor including a large number of sensor chips. Especially, when area chips in small regions have different photoelectric conversion sensitivities, FPN variations become more conspicuous than a 1-line contact sensor and, hence, it is very effective to apply the present invention.

As another modification, when an amplification function is added to the amplifier chip 200, the amplification function may be added to, e.g., the differential amplifier 203 or a gain amplifier may be inserted on the output side of the differential amplifier 203.

In the arrangement shown in FIG. 4A, the sensor chip 100 and amplifier chip 200 use a common power supply. Alternatively, when the power supplies for the sensor chip 100 and amplifier chip 200 are isolated on the mounting substrate, the sensor chip and amplifier chip may use different power supply voltages, or independent GND terminals may be used on the mounting substrate to reduce noise in analog output.

SECOND EMBODIMENT

Figure 7:
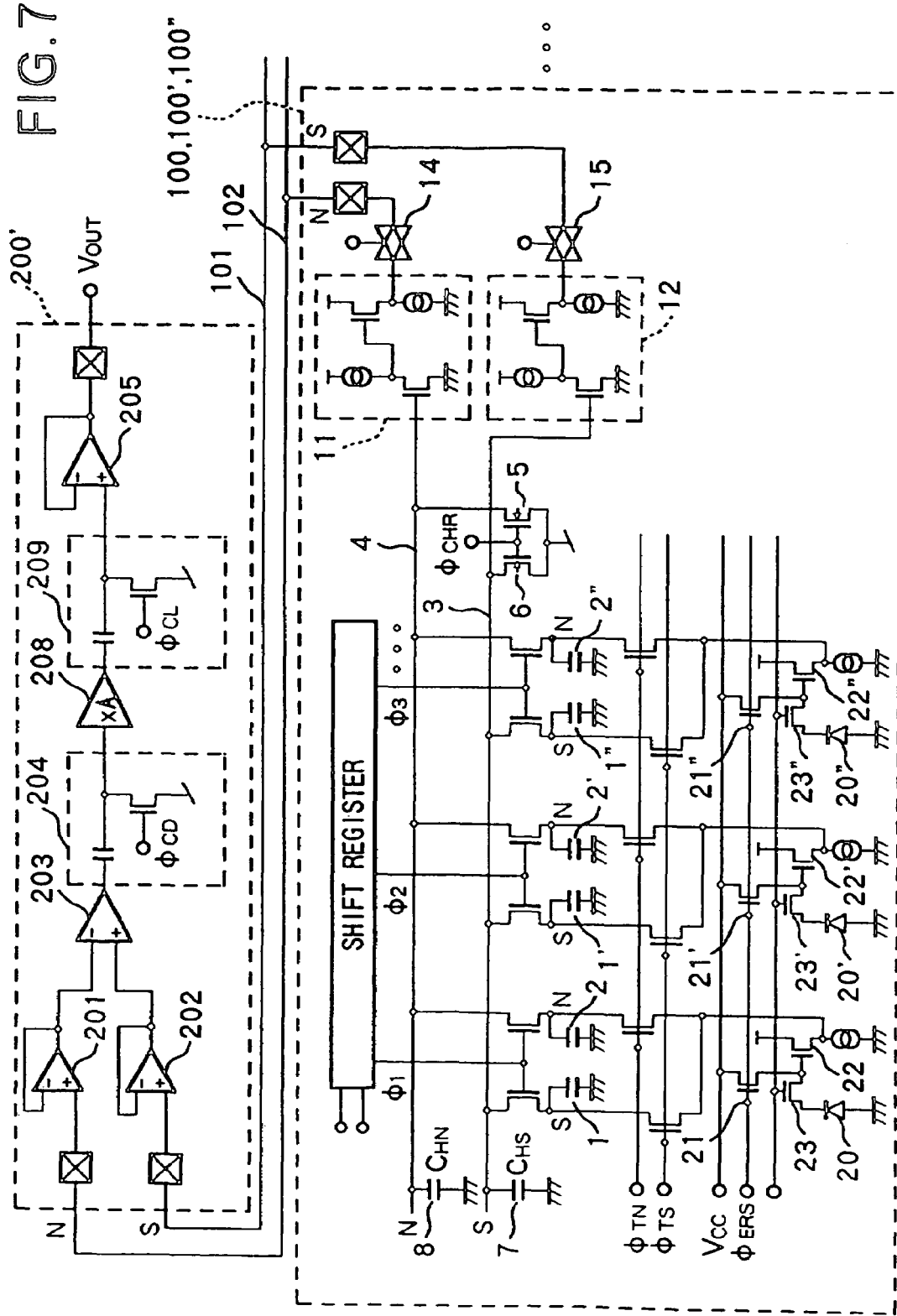
FIG. 7 is the equivalent circuit diagram of an image sensor according to the second embodiment of the present invention.

FIG. 7 is a circuit diagram of an image sensor according to the second embodiment of the present invention. In the second embodiment, photo-electric converters in each of the sensor chips 100, 100', 100", . . . of the first embodiment are respectively constructed by photo-diodes 20, 20', 20", . . . , reset switches 21, 21', 21", . . . , NMOS source-follower transistors 22, 22', 22", . . . , transfer switches 23, 23', 23", . . . .

As other building elements of the second embodiment, each sensor chip has N signal holders 2, 2', 2", . . . , S signal holders 1, 1', 1", . . . , an N signal output line 4, an S signal output line 3, and reset switches 5 and 6, as in the first embodiment (FIG. 4A).

The characteristic feature of the second embodiment lies in that the level of a final output $V_{OUT}$ of a sensor assembly 300 can be adjusted by adding a gain amplifier 208 to an amplifier chip 200'. However, when the gain amplifier 208 is added, the output $V_{OUT}$ of the assembly 300 suffers an individual difference due to individual offset variations in the gain amplifier 208. Such individual difference will be referred to as an "inter-assembly FPN" hereinafter for the sake of simplicity.

In the image sensor of the second embodiment, a clamping circuit 209 is added to remove this "inter-assembly FPN".

The arrangement of the image sensor of the second embodiment will be described in more detail below.

The capacitively divided outputs that appear on the N and S signal output lines 4 and 3 are impedance-converted by source-follower amplifiers 11 and 12 each including two transistors, and are then output onto S and N signal lines 101 and 102 via analog switches 14 and 15. S and N signals on the S and N signal lines 101 and 102 are input to the amplifier chip 200' mounted on the same chip as the sensor chips.

The amplifier chip 200' of the second embodiment comprises an N signal input buffer amplifier 201, S signal input buffer amplifier 202, differential amplifier 203, voltage clamping circuit 204, gain amplifier 208 (gain=A), voltage clamping circuit 209, and output buffer amplifier 205. A clamping control signal to the voltage clamping circuit 204 is $\phi_{CD}$ as in the first embodiment, and a clamping signal for controlling the voltage clamping circuit 209 is $\phi_{CL}$.

Figure 8:
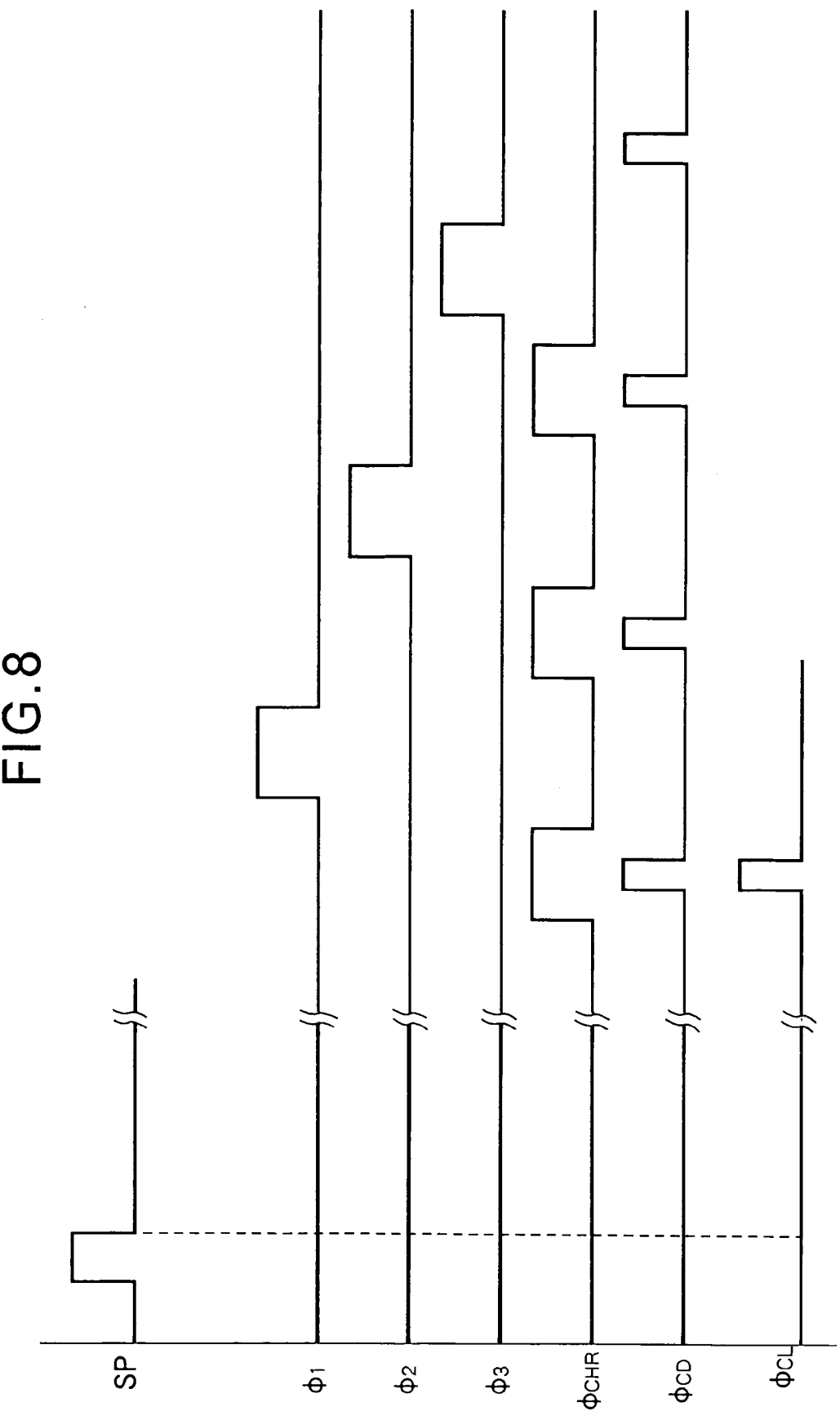
FIG. 8 is a timing chart showing one operation example of the image sensor of the second embodiment.

FIG. 8 is a timing chart of control signals in the second embodiment.

The clamping signal $\phi_{CD}$ to the clamping circuit 204 must be generated at the charge transfer timing ($\phi_1$, $\phi_2$, and $\phi_3$ in FIG. 8) of each bit as in the first embodiment, since it aims at removing FPN for each bit. On the other hand, as the clamping circuit 209 removes offset FPN produced in each assembly, the clamping signal $\phi_{CL}$ for the clamping circuit 209 need only be generated once for a start signal SP (equivalent to a signal SP in FIG. 2) which is generated once for the assembly 300 at the beginning of image reading, as shown in FIG. 8.

In the second embodiment, the voltage clamping circuit 209 reduces offset variations ("inter-assembly FPN") for each module including the sensor chips 100, 100', 100", . . . , and the amplifier chip 200', and a nearly uniform reference level of the module (i.e., the assembly) can be maintained. Since variations of the module (i.e., the assembly) can be reduced, variations in units of products can be reduced, and the manufacture of high-quality products can be achieved.

In the second embodiment, the power supplies and GND terminals for the sensor chips 100, 100', 100", . . . , and amplifier chip 200' are isolated from each other on the mounting substrate, and the power supply voltages for the sensor chip and amplifier chip are respectively 3.3 V and 5.0 V.

The operation of the second embodiment will be described below with reference to the timing chart in FIG. 8.

FIG. 8 shows the drive timing relationship among readout signals $\phi_1$, $\phi_2$, and $\phi_3$ from a shift register SR, a reset pulse $\phi_{CHR}$ of the common signal lines 3 and 4, and reset pulses $\phi_{CD}$ and $\phi_{CL}$ in the amplifier chip 200'.

After signals are read out to the S signal holding capacitances (holders) $C_{TS}$ 1, 1', 1", . . . , and N signal holding capacitances (holders) $C_{TN}$ 2, 2', 2", . . . , read-out signals $\phi_1$, $\phi_2$, $\phi_3$ . . . are output in turn from the shift register SR, and signals detected by the photosensors are read out by capacitance division between $C_{TS}$ and $C_{HS}$, and between $C_{TN}$ and $C_{HN}$. Immediately before these signals are read out, capacitances $C_{HS}$ 7 and $C_{HN}$ 8 are reset to desired voltages by turning on the MOS transistors (switches) 5 and 6 in response to the reset pulse $\phi_{CHR}$. After $C_{HS}$ 7 and $C_{HN}$ 8 are reset, the clamping circuits 204 and 209 enabled by the clamping signals $\phi_{CD}$ and $\phi_{CL}$ generate reference signals. Hence, the outputs after capacitance division contain variations caused by a threshold voltage Vth of the source-follower amplifiers 11 and 12 in units of chips. However, since the outputs are obtained after Vth variations are corrected by the above-mentioned operations of the reset pulses and the like, inter-chip FPN that has posed a problem in the prior art can be removed. That is, in the second embodiment as well, the problem of "inter-chip FPN" can be solved.

In this way, the second embodiment can remove all of "intra-chip FPN", "inter-chip FPN", and "inter-assembly FPN".

More specifically, the inter-chip difference is around 10 mV in the conventional module, but is 3 mV or less in the second embodiment.

Note that $\phi_{CD}$ for controlling the clamping timing of the clamping circuit 204 is generated at the first bit in the second embodiment, but may be generated in synchronism with the generation timings of other bits.

THIRD EMBODIMENT

Figure 9:
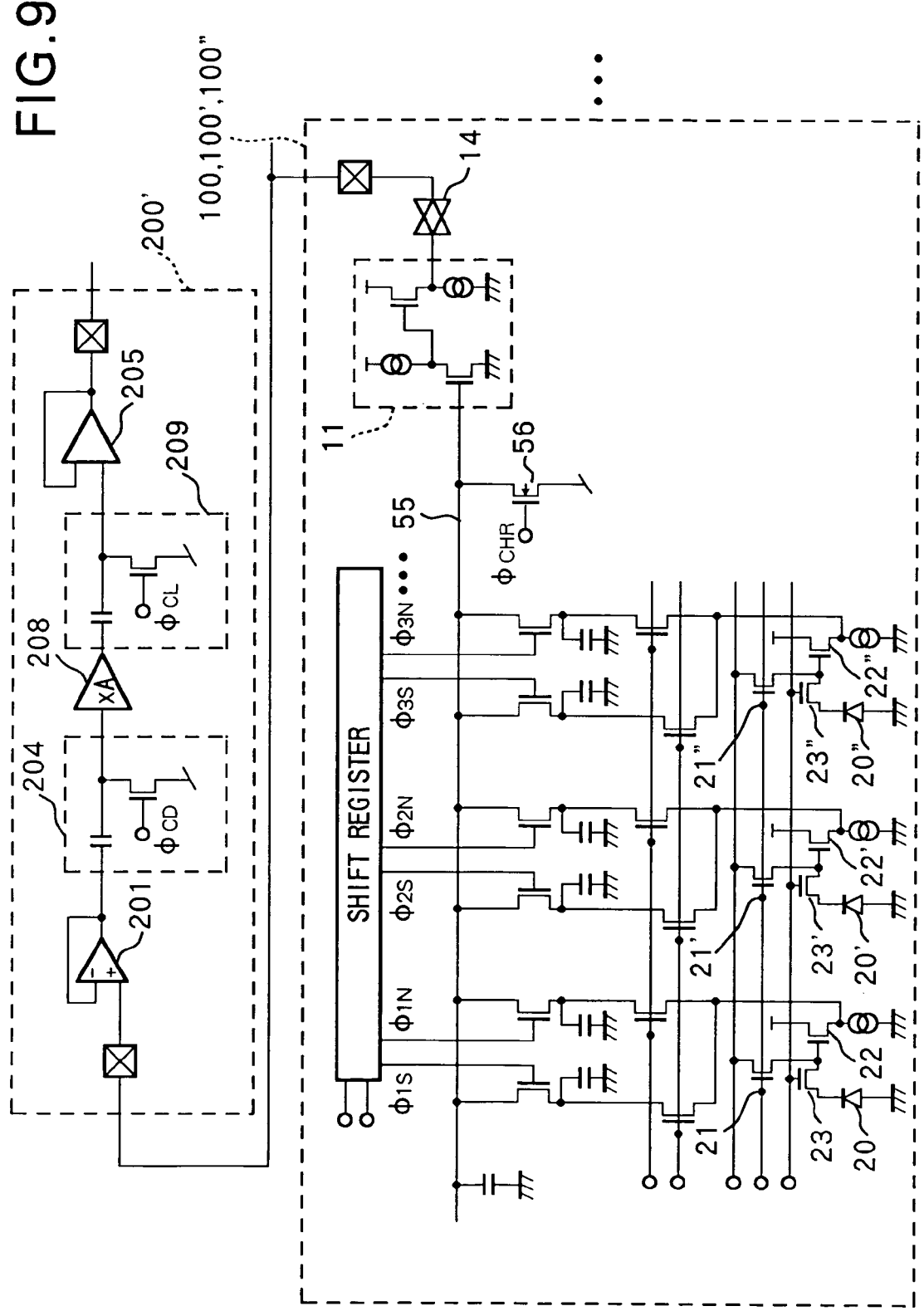
FIG. 9 is the equivalent circuit diagram of an image sensor according to the third embodiment of the present invention.

FIG. 9 is a circuit diagram showing the third embodiment of the present invention. In this embodiment, N and S signals are read out time-serially (i.e., by time division), and the output state of N signals is clamped and is used as a reference signal.

In the third embodiment, the arrangement of each of the sensor chips 100, 100', 100", . . . is substantially the same as that in the second embodiment, i.e., comprises photo-diodes 20, 20', 20", . . . , reset switches 21, 21', 21", . . . , NMOS source-follower transistors 22, 22', 22", . . . , transfer switches 23, 23', 23", . . . , N signal holders 2, 2', 2", . . . , and S signal holders 1, 1', 1", . . . , except that N and S signals are time-serially (time-divisionally) read out onto a single common output line 55. That is, the single common output line 55 is sequentially reset by a reset MOS transistor 56. Since time-division driving is done, the number of source-follower amplifiers 11 including two transistors for amplifying N and S signals can be reduced to one as compared to the second embodiment.

An amplifier chip 200' of the third embodiment comprises an input buffer amplifier 201, voltage clamping circuit 204, gain amplifier 208, voltage clamping circuit 209, and output buffer amplifier 205 as in the second embodiment. That is, the reason why the voltage clamping circuit 209 is added in the third embodiment is to remove "inter-assembly FPN" as in the second embodiment.

Figure 10:
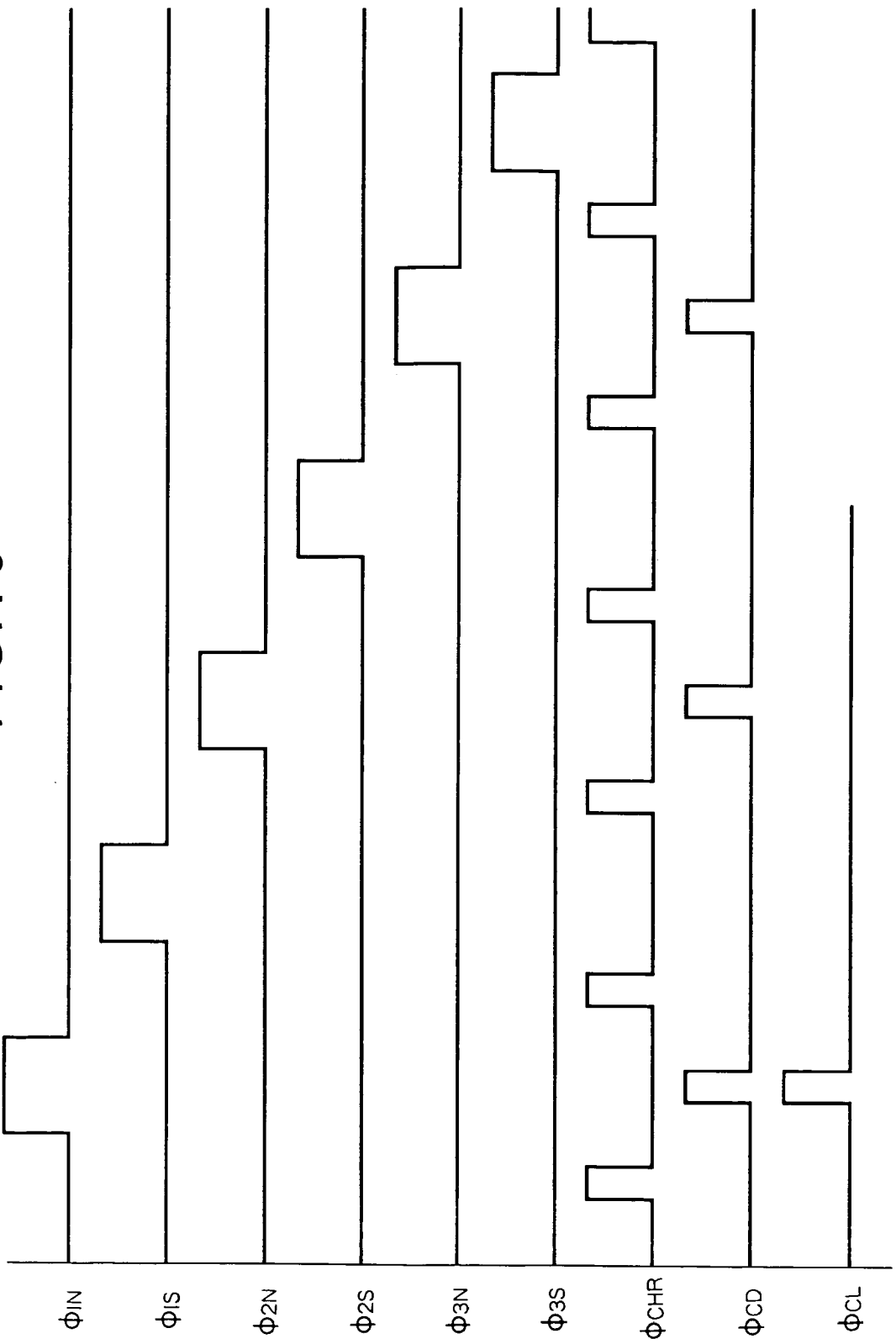
FIG. 10 is a timing chart showing one operation example of the image sensor of the third embodiment.

FIG. 10 shows the operation of the third embodiment, i.e., the drive timing relationship among read-out signals $\phi_{1S}$, $\phi_{1N}$, $\phi_{2S}$, $\phi_{2N}$, $\phi_{3S}$, and $\phi_{3N}$ from a shift register SR, a reset pulse $\phi_{CHR}$ of the common signal line 55, and reset pulses $\phi_{CD}$ and $\phi_{CL}$ in the amplifier chip 200'.

After signals are read out to the S signal holding capacitances (holders) $C_{TS}$ 1, 1', 1", ..., and N signal holding capacitances (holders) $C_{TN}$ 2, 2', 2", ..., the common output line is reset by $\phi_{CHR}$, and an N signal for the first bit is read out by capacitance division onto the common output line 55 in response to $\phi_{1N}$. The read-out state of the N signal is clamped in response to $\phi_{CD}$, and is used as a reference signal for the first bit. Subsequently, the common output line 55 is reset by $\phi_{CHR}$, and an S signal for the first bit is read out by capacitance division onto the common output line 55 in response to $\phi_{1S}$. The difference between the S signal for the first bit and a voltage clamped to the N signal is input to the gain amplifier 208 via the signal input buffer amplifier 201, and variations in units of pixels can be removed by this clamping function. In addition, variations of the sensor chips 100, 100', 100", ... can be removed. Likewise, signals for the second and third bits are read out, and after all the bit pixel signals of the sensor chip are read out, a switch 14 of that sensor chip output is turned off and a signal for the first bit of the next sensor chip is read out.

In the arrangement of the third embodiment, inter-chip FPN is 2.9 mV or less; the FPN removal effect can be improved.

Note that $\phi_{CD}$ for controlling the clamping timing of the clamping circuit 204 is generated at the first bit in the third embodiment, but may be generated in synchronism with the generation timings of other bits.

According to the present invention, a method of driving a high-performance contact image sensor which can remove inter-chip FPN without requiring any dark correction can be provided. More specifically, since the output is clamped using as a reference signal the level obtained upon resetting the common output lines after signals are output from each sensor module to the amplifier chip, a reference potential can be obtained in the final state of photo-electric conversion, thus reliably removing FPN. Of course, since the dynamic range can be maximized, the need for dark level correction means can be obviated. Also, since the state immediately after the common output lines are reset is used as a reference potential for the clamping circuit, the clamping circuit can clamp at a reliable level in correspondence with a stable reset level, thus removing FPN for each chip.

Furthermore, since variations in units of output lines in the capacitively divided outputs from each photo-electric conversion chip can be corrected in units of chips, FPN can be removed as a whole.

According to the present invention, a method of driving a high-performance contact image sensor which can remove inter-chip FPN without requiring any dark correction can be provided. More specifically, since the level obtained upon resetting the common output lines after signals are output from each sensor module to the amplifier chip is clamped as a reference signal, a reference potential can be obtained in the final state of photo-electric conversion, thus reliably removing FPN. Of course, since the dynamic range can be maximized, the need for dark level correction can be obviated. Also, since the state immediately after the common output lines are reset is used as a reference potential for the clamping circuit, the clamping circuit can clamp at a reliable level in correspondence with a stable reset level, thus removing FPN for each chip.

As described above, the image sensor assembly 300 according to each of the first to third embodiments can be constructed by discrete circuit parts. However, the present invention is more effective when the module chips 100 and amplifier chips 200 are integrated into a single module. In other words, the image sensor of each of the first to third embodiments strongly has an aspect of a semiconductor device. In general, when the outputs from a plurality of semiconductor chips which form a module and have an identical function are combined, inter-chip FPN is produced as in the image sensor of the present invention. Hence, the FPN removal method of the present invention can be applied to such semiconductor device.

As many apparently widely different embodiments of the present invention can be made without departing from the spirit and scope thereof, it is to be understood that the invention is not limited to the specific embodiments thereof except as defined in the appended claims.

What is claimed is:

1. An image sensor comprising:
a plurality of photo sensor chips mounted on a single mounting substrate, each photo sensor chip having a plurality of photo-electric conversion circuits, a common output line through which signals from said plurality of photo-electric conversion circuits are outputted, and a photo sensor chip output device which outputs signals from said common output line to outside of said photo sensor chip, wherein each said photo-electric conversion circuit has a photo-electric conversion part and an amplifier for amplifying an output signal from the photo-electric conversion part; and
a correction circuit output chip mounted on said single mounting substrate, said correction circuit output chip having a noise compensation circuit which receives a noise signal outputted from the amplifier and including an offset component of the amplifier, the noise signal being obtained by resetting an input portion of the amplifier and a photo-electric conversion signal generated in said photo-electric conversion part, wherein said noise compensation circuit corrects a noise component of the photo-electric conversion signal by using the noise signal outputted from the amplifier,
wherein said correction circuit output chip is arranged commonly to said plurality of photo sensor chips,
wherein an output terminal for outputting a signal to outside of said correction circuit output chip and an output terminal for outputting a signal to outside of said single mounting substrate are connected to each other, and
wherein said noise compensation circuit has a plurality of clamp circuits that are serially connected.

* * * * *

UNITED STATES PATENT AND TRADEMARK OFFICE
CERTIFICATE OF CORRECTION

PATENT NO. : 6,950,132 B1
DATED : September 27, 2005
INVENTOR(S) : Hiraku Kozuka It is certified that error appears in the above-identified patent and that said Letters Patent is hereby corrected as shown below:

Column 6,
Line 9, "CTS" should read -- $C_{TS}$ --.

Column 7,
Line 26, "lines 4, 41, 4''" should read -- lines 4, 4', 4" --.

Column 8,
Line 15, "vth variations" should read -- Vth variations --.

Column 11,
Line 21, "$\phi_{1N}$ The" should read -- $\phi_{1N}$. The --.

Signed and Sealed this

Twenty-first Day of February, 2006

JON W. DUDAS
*Director of the United States Patent and Trademark Office*